United States Patent
Teh (10) Patent No.: US 9,602,000 B2
(45) Date of Patent: Mar. 21, 2017

(54) POWER SUPPLY CIRCUIT AND CONTROL METHOD THEREOF

(71) Applicant: KABUSHIKI KAISHA TOSHIBA, Minato-ku, Tokyo (JP)

(72) Inventor: Chen Kong Teh, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 25 days.

(21) Appl. No.: 14/844,930

(22) Filed: Sep. 3, 2015

(65) Prior Publication Data
US 2016/0172974 A1 Jun. 16, 2016

(30) Foreign Application Priority Data
Dec. 15, 2014 (JP) .................................. 2014-253264

(51) Int. Cl.
*H02M 3/158* (2006.01)
*H02M 1/00* (2006.01)

(52) U.S. Cl.
CPC .... *H02M 3/158* (2013.01); *H02M 2001/0025* (2013.01); *H02M 2001/0032* (2013.01)

(58) Field of Classification Search
CPC ......... H02M 3/158; H02M 2001/0032; H02M 2001/0025
USPC .......................................... 323/271, 282–288
See application file for complete search history.

(56) References Cited

U.S. PATENT DOCUMENTS

| | | | | |
|---|---|---|---|---|
| 7,221,129 B2* | 5/2007 | Matsuo | ................ | H02M 3/158 323/222 |
| 7,541,788 B2* | 6/2009 | Katoh | ................ | H02M 3/156 323/271 |
| 7,629,782 B2* | 12/2009 | Naka | ................ | H02M 3/157 323/271 |
| 7,969,132 B2* | 6/2011 | Hibi | ................ | H02M 3/156 323/282 |
| 8,018,743 B2* | 9/2011 | Wang | ................ | H02M 3/33507 323/284 |
| 8,373,400 B2* | 2/2013 | Qiu | ................ | H02M 3/1588 323/282 |

(Continued)

FOREIGN PATENT DOCUMENTS

JP 2007259658 A 10/2007
JP 2009005492 A 1/2009

OTHER PUBLICATIONS

Received search report from STIC EIC 2800 searcher Benjamin Martin on Sep. 16, 2016.*

*Primary Examiner* — Timothy J Dole
*Assistant Examiner* — Htet Z Kyaw
(74) *Attorney, Agent, or Firm* — Holtz, Holtz & Volek PC (57) ABSTRACT

According to one embodiment, a power supply circuit includes a switching element to which a drive signal is supplied, a control value generating circuit that compares an output voltage and a reference voltage to generate a control value, and a comparison circuit that compares a feedback current and the control value. The power supply circuit has a generating circuit that generates a clock signal having a constant period in a PWM control mode and a clock signal according to the output voltage in a PFM control mode. The control value of the control value generating circuit is changed so that averages of the feedback current before and after the control mode switching become equal.

20 Claims, 6 Drawing Sheets

(56) References Cited

U.S. PATENT DOCUMENTS

| | | | | |
|---|---|---|---|---|
| 8,493,042 B2* | 7/2013 | Kawagoe | .............. | H02M 3/156 323/271 |
| 8,493,050 B2* | 7/2013 | Miyamae | .............. | H02M 3/156 323/284 |
| 9,093,899 B2* | 7/2015 | Jayaraj | .................. | H02M 3/156 |
| 9,401,637 B2* | 7/2016 | Wei | ....................... | H02M 3/156 |
| 2008/0061758 A1* | 3/2008 | Nishida | ................. | H02M 3/156 323/284 |
| 2009/0079408 A1* | 3/2009 | Qiao | .................... | H02M 3/157 323/283 |
| 2009/0174384 A1* | 7/2009 | Michishita | ........... | H02M 3/158 323/285 |
| 2009/0218999 A1* | 9/2009 | Kikuchi | ................ | H02M 3/156 323/282 |
| 2012/0153919 A1* | 6/2012 | Garbossa | .............. | H02M 3/156 323/284 |
| 2015/0028830 A1* | 1/2015 | Chen | .................... | H02M 3/158 323/271 |

\* cited by examiner

POWER SUPPLY CIRCUIT AND CONTROL METHOD THEREOF

CROSS-REFERENCE TO RELATED APPLICATIONS

This application is based upon and claims the benefit of priority from Japanese Patent Application No. 2014-253264, filed on Dec. 15, 2014; the entire contents of which are incorporated herein by reference.

FIELD

Embodiments described herein relate generally to a power supply circuit and a control method thereof.

BACKGROUND

Conventionally, there has been disclosed a power supply circuit technique which performs PWM (Pulse Width Modulation) control when the load is heavy and which, when the load is light, switches to PFM (Pulse Frequency Modulation) control.

However, when the control mode of the power supply circuit is switched between PWM control and PFM control, a ripple may occur in output voltage, causing variation in the output voltage. Accordingly, a technique is desired which lessens a ripple in the output voltage when the control mode is switched between PWM control and PFM control.

DETAILED DESCRIPTION

In general, according to one embodiment, a power supply circuit is provided which comprises a switching element of which a main current path is connected between an input end to which to apply a direct-current input voltage and an output end outputting an output voltage, the switching element being controlled to be on/off by a drive signal applied to the control electrode thereof. The power supply circuit has a control value generating circuit that compares the output voltage and a predetermined reference voltage to generate a control value based on the comparing result; a comparison circuit that compares a feedback current corresponding to an output current and the control value; and a switching signal generating circuit that generates a switching signal having a constant period in a PWM control mode and generates a switching signal at timings when the output voltage becomes less than a predetermined threshold voltage in a PFM control mode. The power supply circuit has a drive signal generating circuit that generates the drive signal whose pulse widths are adjusted according to the comparing result of the comparison circuit in response to the switching signal from the switching signal generating circuit; and a control circuit that, in switching a control mode between the PWM control mode and the PFM control mode, changes the control value so that an average of the feedback current after the control mode switching becomes equal to an average of the feedback current before the control mode switching.

Exemplary embodiments of a power supply circuits and control methods thereof will be explained below in detail with reference to the accompanying drawings. The present invention is not limited to the following embodiments.

First Embodiment

Figure 1:
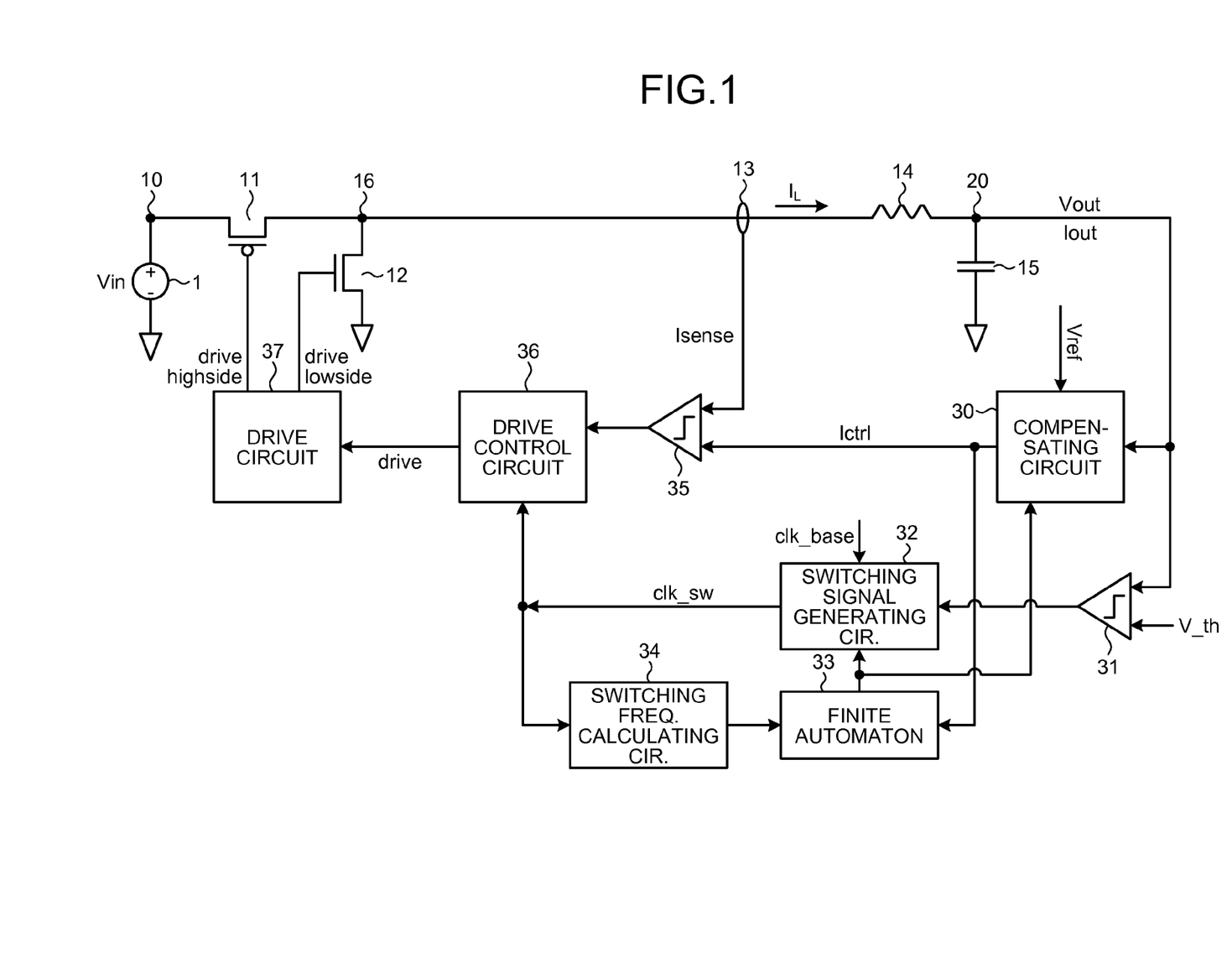
FIG. 1 is a diagram showing the configuration of a power supply circuit of a first embodiment.

FIG. 1 is a diagram showing the configuration of a power supply circuit of the first embodiment. The power supply circuit of this embodiment has an input terminal 10. An input voltage source 1 to supply a direct-current voltage Vin is connected to the input terminal 10. The source electrode of a first switching transistor 11 is connected to the input terminal 10. The drain electrode of the first switching transistor 11 is connected to a terminal 16. The gate electrode of the first switching transistor 11 is connected to a drive circuit 37. The first switching transistor 11 is controlled to be on/off by a drive signal drive_highside from the drive circuit 37. The source-to-drain path that is the main current path of the first switching transistor 11 is connected between the input terminal 10 and an output terminal 20.

The drain electrode of a second switching transistor 12 is connected to the terminal 16. The source electrode of the second switching transistor 12 is grounded. The gate electrode of the second switching transistor 12 is connected to the drive circuit 37. The second switching transistor 12 is controlled to be on/off complementarily to the first switching transistor 11 by a drive signal drive_lowside from the drive circuit 37. Note that the drive circuit 37 may be configured to generate the drive signal drive_highside for driving the first switching transistor 11 and the drive signal drive_lowside for driving the second switching transistor 12 from a drive signal "drive" generated by a drive control circuit 36, or that the drive control circuit 36 may be configured to generate the drive signal drive_highside for driving the first switching transistor 11 and the drive signal drive_lowside for driving the second switching transistor 12 for the drive circuit 37 to amplify these drive signals drive_highside and drive_lowside.

One end of an inductance 14 is connected to the terminal 16, and the other end of the inductance 14 is connected to the output terminal 20. One end of a smoothing capacitor 15 is connected to the output terminal 20. The other end of the smoothing capacitor 15 is grounded. A load (not shown) is connected to the output terminal 20. An output voltage Vout on the output terminal 20 and an output current Iout are supplied to the load.

The output voltage Vout is supplied to a compensating circuit 30. A predetermined reference voltage Vref is supplied to the compensating circuit 30. The compensating circuit 30 compares the output voltage Vout and the reference voltage Vref and performs PID (Proportional Integral Derivative) control to make the output voltage Vout equal to the reference voltage Vref, with generating and outputting a control value Ictrl for that control.

The control value Ictrl is supplied to a comparison circuit 35. A feedback current Isense obtained from an inductance current $I_L$ is supplied to the comparison circuit 35. The feedback current Isense is the detecting result of a current sensor 13 and supplied to the comparison circuit 35. The current sensor 13 is formed of, e.g., a resistor (not shown) connected in series to the inductance 14 and a differential amplifier (not shown) for detecting the voltage drop across that resistor. The inductance current $I_L$ is supplied via the inductance 14 to the output terminal 20 and supplied as an output current Iout to the load. Thus, by detecting the inductance current $I_L$ so as to feed back in the form of the feedback current Isense, a load current, i.e., the output current Iout can be detected.

The output voltage Vout and a threshold voltage V_th are supplied to a comparison circuit 31. The comparison circuit 31 supplies a signal of a high level to a switching signal generating circuit 32, for example, when the output voltage Vout becomes lower than the threshold voltage V_th.

The comparison circuit 35 compares the feedback current Isense with the control value Ictrl and supplies the comparing result to the drive control circuit 36. The drive control circuit 36 comprises, e.g., an RS flip-flop circuit (not shown), and the output signal of the comparison circuit 35 is supplied to the reset terminal (not shown) of that RS flip-flop circuit. When the feedback current Isense becomes greater than the control value Ictrl, the RS flip-flop circuit of the drive control circuit 36 is reset, so that the drive signal "drive" outputted from the drive control circuit 36 falls. By this means, the on time of the first switching transistor 11 is controlled.

A clock signal clk_sw that is the output signal of the switching signal generating circuit 32 is supplied to a switching frequency calculating circuit 34. The frequency of the clock signal clk_sw is equal to the switching frequency of the first switching transistor 11 and the second switching transistor 12. The switching frequency calculating circuit 34 comprises, e.g., a counter (not shown) and counts the frequency of the clock signal clk_sw during a given period of time.

The control value Ictrl from the compensating circuit 30 and the output of the switching frequency calculating circuit 34 are supplied to a finite automaton 33. The finite automaton 33 receives the output of the switching frequency calculating circuit 34 and the control value Ictrl from the compensating circuit 30 to determine whether the load is heavy or light.

For example, if the frequency of the clock signal clk_sw of the switching signal generating circuit 32 during a given period of time exceeds a predetermined threshold frequency fth, the finite automaton 33 determines that the load has become heavy and controls the switching signal generating circuit 32 to perform PWM control. In contrast, if the control value Ictrl from the compensating circuit 30 becomes smaller than a predetermined threshold Ith, the finite automaton 33 determines that the load has become light and controls the switching signal generating circuit 32 to perform PFM control. In switching the control mode between PWM control and PFM control, the finite automaton 33 performs control to rewrite the control value Ictrl of the compensating circuit 30 so that averages of the feedback current Isense before and after the control mode switching are equal. This rewriting of the control value will be described later.

A reference clock signal clk_base, the output signal of the comparison circuit 31, and a control signal from the finite automaton 33 are supplied to the switching signal generating circuit 32. The switching signal generating circuit 32, under the control of the finite automaton 33, outputs, e.g., a clock signal clk_sw whose risings are controlled by the reference clock signal clk_base in PWM control and outputs a clock signal clk_sw whose risings are controlled by the output signal from the comparison circuit 31 in PFM control.

The switching signal generating circuit 32 has, e.g., a counter (not shown). By setting a count value in the counter as needed, the risings and fallings of the clock signal clk_sw of the switching signal generating circuit 32 can be controlled. For example, the switching signal generating circuit 32 can be configured to generate the clock signal clk_sw which rises at a zeroth count value of clock pulses of the reference clock signal clk_base and which falls at an Nth count value. Note that, for example, the switching signal generating circuit 32 may be configured to have a ring oscillator (not shown) therein to use a signal of a reference frequency (not shown) outputted by the ring oscillator as the reference clock signal clk_base.

According to the present embodiment, the risings of the drive signal "drive", in PWM control, are controlled to follow the risings of the clock signal clk_sw having a constant period that is generated from the reference clock signal clk_base and, in PFM control, are controlled to follow the timings when the output voltage Vout becomes lower than the threshold voltage V_th. In contrast, the fallings of the drive signal "drive" are controlled to follow the timings when the feedback current Isense becomes greater than the control value Ictrl in both PWM control and PFM control. That is, in both PWM control and PFM control, peak values of the feedback current Isense are limited by the control value Ictrl. Thus, in switching the control mode between PWM control and PFM control, by controlling the control value Ictrl, the averages of the feedback current Isense before and after the control mode switching can be controlled to be equal. By controlling so that the averages of the feedback current Isense are equal, control can be performed to make the averages of the inductance current $I_L$, thus, the averages of the output current Iout be equal, and hence the occurrence of a ripple in the output voltage Vout associated with the control mode switching can be suppressed.

Figure 2:
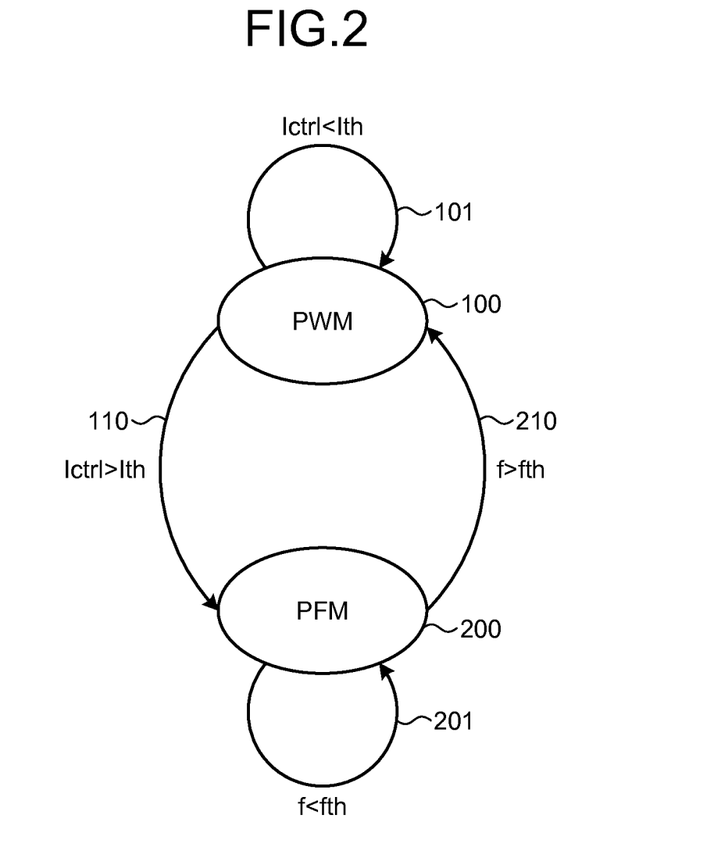
FIG. 2 is a diagram for explaining the control method of the power supply circuit of the first embodiment.

FIG. 2 is a diagram for explaining the control method of the power supply circuit of the first embodiment. FIG. 2 is a state transition diagram showing the steps in switching the control mode. PWM control for a heavy load (100) is maintained while the control value Ictrl of the compensating circuit 30 is less than the predetermined threshold Ith (101). When the control value Ictrl becomes greater than the predetermined threshold Ith, control to make a transition to PFM control (200) is performed (110). This is control for the case where the load becomes light and where thus the error between the output voltage Vout and the reference voltage Vref has become large.

While the frequency f of the clock signal clk_sw is less than the threshold fth, PFM control is maintained (201).

When the frequency f of the clock signal clk_sw becomes greater than the threshold fth, a transition to PWM control is made (210). This is control for the case where the load becomes heavy and where thus the frequency at which the output voltage Vout becomes lower than the threshold voltage V_th has increased.

Second Embodiment

Figure 3:
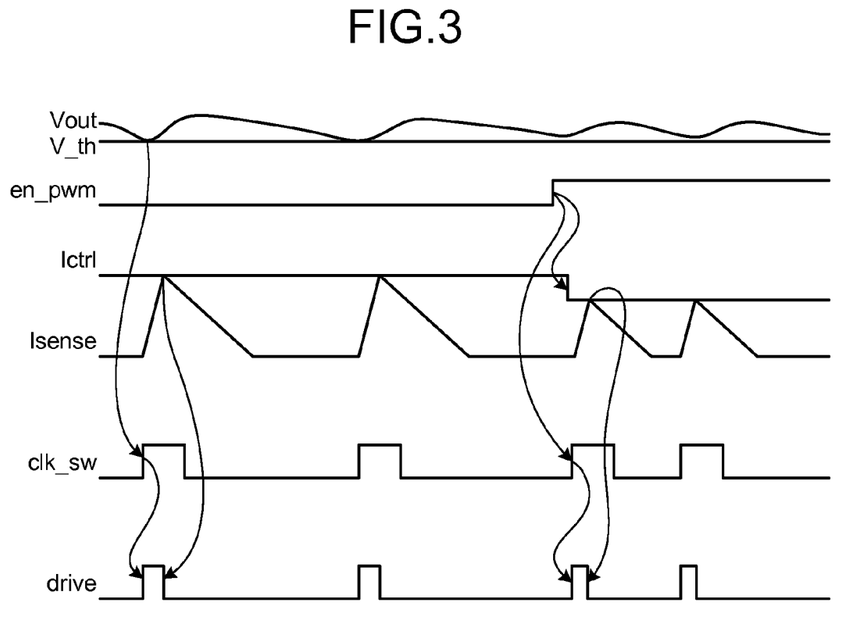
FIG. 3 is a diagram for explaining the control method of a power supply circuit of a second embodiment.

FIG. 3 is a diagram for explaining the control method of a power supply circuit of the second embodiment and shows the control method where PFM control is switched to PWM control. When the output voltage Vout becomes lower than the threshold voltage V_th, the clock signal clk_sw of the switching signal generating circuit 32 rises. In response to the clock signal clk_sw rising, the drive signal "drive" rises.

When the feedback current Isense becomes greater than the control value Ictrl, the flip-flop circuit (not shown) of the drive control circuit 36 is reset, so that the drive signal "drive" falls. PFM control is performed which generates the drive signal "drive" that rises in response to the risings of the clock signal clk_sw having a constant period and that falls in response to the result of comparing the feedback current Isense and the control value Ictrl. The peak values of the feedback current Isense are controlled according to the control value Ictrl.

When the frequency f of the clock signal clk_sw becomes greater than the threshold fth, the finite automaton 33 sets a PWM enable signal en_pwm at a high level. In response to the PWM enable signal en_pwm rising to the high level, the switching signal generating circuit 32 outputs the clock signal clk_sw. That is, a phase shift of the clock signal clk_sw is performed. For example, by resetting a counter (not shown) provided in the switching signal generating circuit 32 to cause the clock signal clk_sw to rise, a phase shift of the clock signal clk_sw can be performed. After the phase shift of the clock signal clk_sw is performed, the switching signal generating circuit 32 outputs the clock signal clk_sw having a constant period according to a predetermined count value set in the counter.

In response to the PWM enable signal en_pwm rising, the finite automaton 33 performs control to calculate a new control value Ictrl and to rewrite the control value Ictrl of the compensating circuit 30. The new control value Ictrl is set at such a value that the average of the feedback current Isense is equal to the feedback current Isense before the control mode switching. The method of calculating this new control value Ictrl will be described later. At the timing when the feedback current Isense becomes greater than the new control value Ictrl, the drive signal "drive" falls. That is, in PWM control, the risings of the drive signal "drive" are controlled to follow the risings of the clock signal clk_sw rising, and the fallings of the drive signal "drive" are controlled to follow the timings when the feedback current Isense becomes greater than the control value Ictrl.

According to the control method of the power supply circuit of the present embodiment, a transition from PFM control to PWM control is made when the frequency f of the clock signal clk_sw becomes greater than the threshold fth. The transition from PFM control to PWM control causes a transition from control in which the clock signal clk_sw is outputted when the output voltage Vout becomes lower than the threshold voltage V_th to control in which the clock signal clk_sw is outputted at regular timings. In both control modes, PFM control and PWM control, the peak values of the feedback current Isense are controlled according to the control value Ictrl. Thus, by adjusting the control value Ictrl in response to switching the control mode between PWM control and PFM control, the averages of the feedback current Isense before and after the control mode switching can be set equal. The method of setting the control value will be described later.

Third Embodiment

Figure 4:
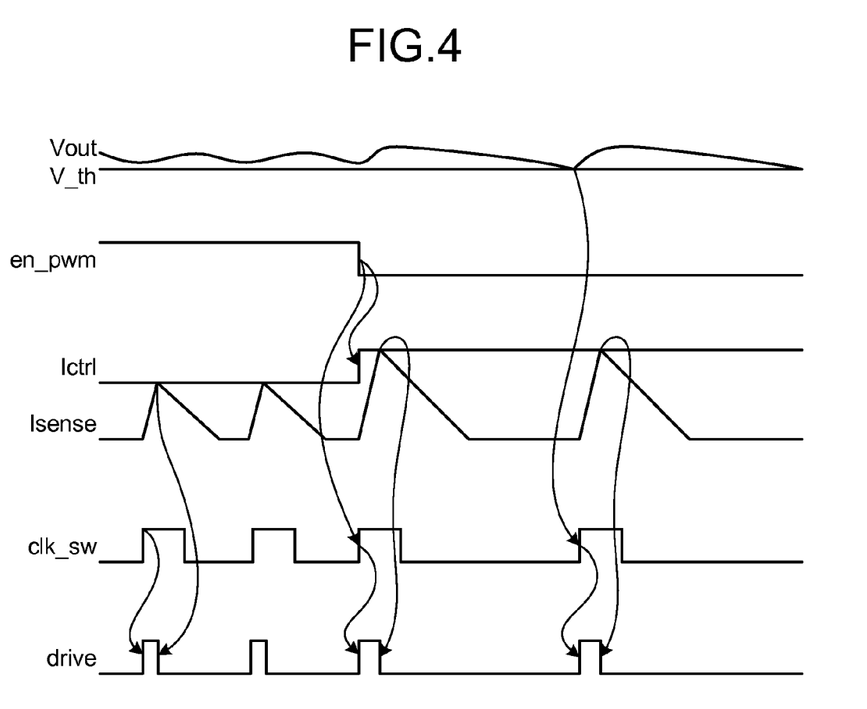
FIG. 4 is a diagram for explaining the control method of a power supply circuit of a third embodiment.

FIG. 4 is a diagram for explaining the control method of a power supply circuit of the third embodiment and shows the control method where PWM control is switched to PFM control. In PWM control, in response to the clock signal clk_sw rising, the drive signal "drive" rises, and at the timings when the feedback current Isense becomes greater than the control value Ictrl, the drive signal "drive" falls.

When the control value Ictrl becomes greater than the threshold Ith, the finite automaton 33 sets the PWM enable signal en_pwm at a low level and switches the control mode to PFM control, which corresponds to the state where the load becomes light and where thus the error between the output voltage Vout and the reference voltage Vref has become large. In response to the PWM enable signal en_pwm becoming the low level, the clock signal clk_sw rises. For example, a counter (not shown) provided in the switching signal generating circuit 32 is reset to cause the clock signal clk_sw to rise. After switching from PWM control to PFM control, the clock signal clk_sw rises in response to the timings when the output voltage Vout becomes lower than the threshold voltage V_th. That is, the risings of the clock signal clk_sw are controlled according to the output signal from the comparison circuit 31. That is, PFM control, which controls the risings of the drive signal "drive" to follow the timings when the output voltage Vout becomes less than the threshold voltage V_th, is performed.

The drive signal "drive" falls in response to the timings when the feedback current Isense becomes greater than the control value Ictrl.

According to the control method of the power supply circuit of the present embodiment, a transition from PWM control to PFM control is made when the control value Ictrl becomes greater than the threshold Ith. The transition from PWM control to PFM control causes a transition from control in which the drive signal "drive" rises in response to the clock signal clk_sw outputted at regular timings to control in which the drive signal "drive" rises in response to the clock signal clk_sw outputted when the output voltage Vout becomes lower than the threshold voltage V_th. In contrast, the drive signal "drive" is controlled to fall in response to the timings when the feedback current Isense becomes greater than the control value Ictrl. That is, in both PWM control and PFM control, the peak values of the feedback current Isense are controlled according to the control value Ictrl. Since in PFM control the occurrence timing in the clock signal clk_sw varies according to the result of comparing the output voltage Vout and the threshold voltage V_th, and the average of the inductance current $I_L$ after switching from PWM control to PFM control is controlled to be equal to the average of the inductance current $I_L$ before the switching, a new control value Ictrl at transition to PFM control can be set as needed.

Fourth Embodiment

Figure 5:
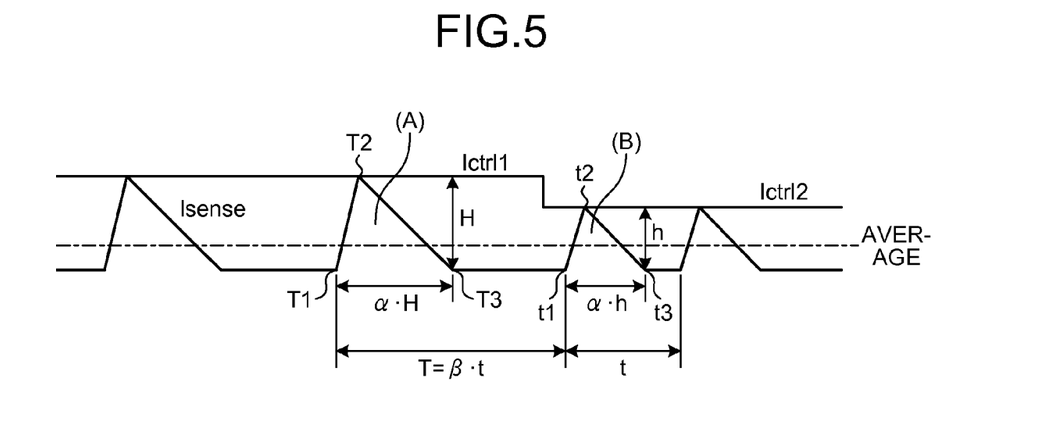
FIG. 5 is a diagram for explaining the control method of a power supply circuit of a fourth embodiment.

FIG. 5 is a diagram for explaining the control method of a power supply circuit of the fourth embodiment. The method of setting the control value Ictrl at the time of switching the control mode from PFM control to PWM control will be described.

The area of a triangle (A) formed by the feedback current Isense in PFM control before switching the control mode, that is, a triangle (A) defined by points T1, T2, and T3 can be expressed by 0.5×α×H×H, where H is the height and α×H is the width. In contrast, the area of a triangle (B) formed by the feedback current Isense after switching the control mode to PWM control, that is, a triangle (B) defined by points t1, t2, and t3 can be expressed by 0.5×α×h×h, where h is the height and α×h is the width.

The triangles (A) and (B) each correspond to a charge amount. Thus, values obtained by dividing the charge amounts corresponding to the areas of the triangles (A) and (B) by their respective periods T (=β×t) and t are averages of the feedback current Isense over their respective periods.

Thus, by making a value obtained from 0.5×α×H×H/T and a value obtained from 0.5×α×h×h/t equal, the averages of the feedback current Isense before and after switching the control mode can be made equal.

The heights H and h of the triangles (A) and (B) are controlled according to control values Ictrl1 and Ictrl2 respectively. That is, the heights H and h at points T2 and t2 can be obtained from the control values Ictrl1 and Ictrl2 respectively.

Further, because the gradients of oblique sides of the triangles (A) and (B) are determined by the inductance 14, the triangles (A) and (B) are similar in shape. Thus, the ratios a between the heights (H, h) and the base lengths of the triangles (A) and (B) are equal.

Therefore, if the relation between the period T before switching the control mode and the period t after switching is represented by T=β×t, by setting the height h of the triangle (B) at a value obtained by dividing the height H of the triangle (A) by the square root of β, the averages of the feedback current Isense before and after switching the control mode can be made equal. Note that as the period T before switching, not a period immediately before the switching but the average of periods of multiple cycles may be used.

The control value Ictrl outputted by the compensating circuit 30 is expressed by, e.g., the following equation (1).

$$Ictrl[n]=Ictrl[n-1]+a\times error[n]+b\times error[n-1]+c\times error[n-2]+d\times error[n-3] \quad (1)$$

In the equation (1), "errors" denote error values, and a, b, c, and d denote compensation coefficients. Further, [n] indicates being a current value; [n−1] indicates being a value in the preceding cycle; [n−2] indicates being a value in the cycle preceding by two cycles; and [n−3] indicates being a value in the cycle preceding by three cycles. A value obtained by dividing Ictrl[n−1] by the square root of β is obtained as the new control value Ictrl[n], and by replacing the control value of the compensating circuit 30 with that new control value, the average of the feedback current Isense after switching the control mode can be made equal to the average of the feedback current Isense before switching the control mode.

According to the present embodiment, only by rewriting the control value Ictrl, the averages of the feedback current Isense before and after switching the control mode can be controlled to be equal, and hence it is easy to control. By making the averages of the feedback current Isense before and after switching the control mode equal, the occurrence of a ripple in the output voltage Vout associated with the control mode switching can be suppressed.

Fifth Embodiment

Figure 6:
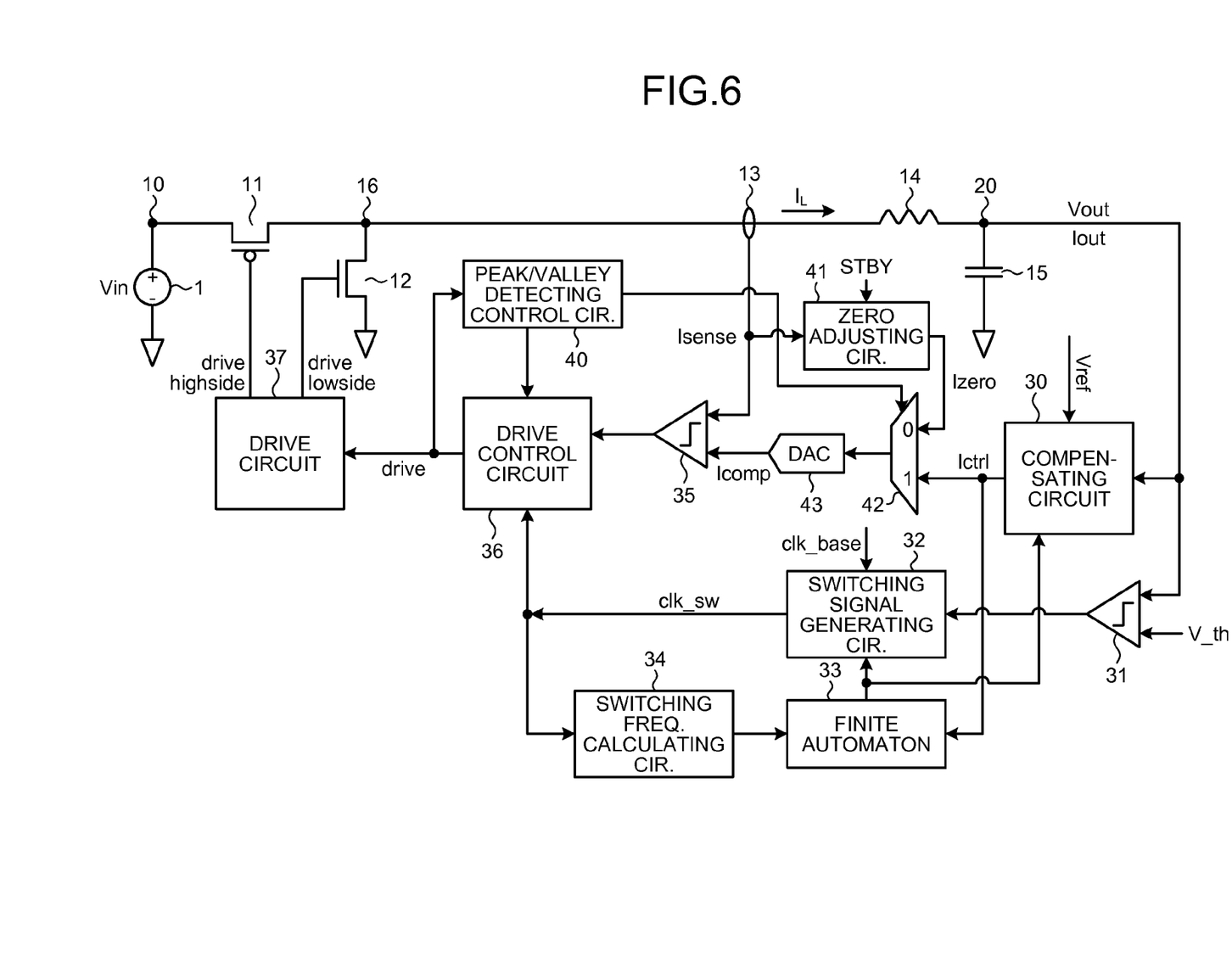
FIG. 6 is a diagram showing the configuration of a power supply circuit of a fifth embodiment.

FIG. 6 is a diagram showing the configuration of a power supply circuit of the fifth embodiment. The same reference numerals are used to denote constituents corresponding to those of the already-described embodiments, and a duplicate description thereof will be made only if necessary. The power supply circuit of the present embodiment has a peak/valley detecting control circuit 40 that receives the output signal of the drive control circuit 36. The control signal from the peak/valley detecting control circuit 40 switches the operation mode of a selector circuit 42 and the drive control circuit 36 between a peak detecting mode and a valley detecting mode.

The feedback current Isense is supplied to a zero adjusting circuit 41. The zero adjusting circuit 41 reads and holds the value of the feedback current Isense when in a standby state in response to a control signal STBY and supplies the selector circuit 42 with a control value Izero corresponding to the value of the feedback current Isense when in the standby state. The selector circuit 42 switches between the control value Izero and the control value Ictrl from the compensating circuit 30 according to the control signal from the peak/valley detecting control circuit 40.

The output of the selector circuit 42 is supplied to a DA converter 43. A control value Icomp converted to analog form by the DA converter 43 is supplied to the comparison circuit 35.

The drive signal "drive" generated by the drive control circuit 36 is supplied to the drive circuit 37 and amplified by the drive circuit 37 to be supplied as the drive signal drive_highside for driving the first switching transistor 11 and the drive signal drive_lowside for driving the second switching transistor 12 to the gates of the first switching transistor 11 and the second switching transistor 12. Note that the drive signal "drive" outputted by the drive control circuit 36 includes the drive signal drive_highside for driving the first switching transistor 11 and the drive signal drive_lowside for driving the second switching transistor 12 and that they are collectively referred to as the drive signal "drive" for convenience.

Sixth Embodiment

Figure 7:
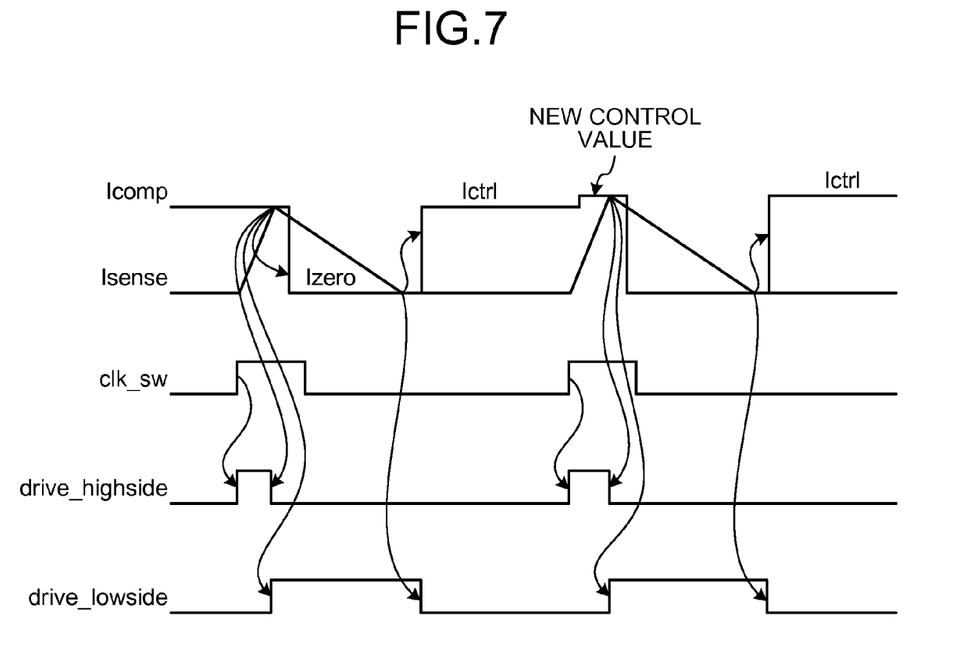
FIG. 7 is a diagram for explaining the control method of a power supply circuit of a sixth embodiment.

A control method of the power supply circuit of the embodiment shown in FIG. 6 will be described using FIG. 7. In the present embodiment, in response to the clock signal clk_sw rising, the drive signal drive_highside for turning on the first switching transistor 11 rises. When the feedback current Isense becomes greater than the control value Icomp, the drive signal drive_highside for driving the first switching transistor 11 falls. That is, the peak values of the feedback current Isense are controlled according to the control value Icomp. When the control is switched to PWM control, a new control value Ictrl is set by the compensating circuit 30 according to the error value between the output voltage Vout and the reference voltage Vref. "NEW CONTROL VALUE" stated in the upper portion of FIG. 7 indicates that control value.

At the timings when the feedback current Isense becomes greater than the control value Icomp, the drive signal drive_lowside for turning on the second switching transistor 12 rises. At the timings when the feedback current Isense becomes greater than the control value Icomp, the peak/valley detecting control circuit 40 controls the selector circuit 42 to switch the mode to the valley detecting mode. That is, the control is switched to control in which the control value Izero from the zero adjusting circuit 41 is supplied to the DA converter 43.

After switching to the valley detecting mode, at the timings when the feedback current Isense becomes less than the control value Izero, the drive signal drive_lowside falls. That is, at the timings when the feedback current Isense becomes less than the control value Izero, the second switching transistor 12 is turned off. By turning off the second switching transistor 12, a phenomenon in which the inductance current $I_L$ flows backward to the ground side can be avoided. Thus, because the inductance current $I_L$ being shunt to the ground side can be avoided, power efficiency can be improved.

In the power supply circuit of the present embodiment, the peak detecting mode and the valley detecting mode can be executed by one comparison circuit 35. That is, by switching the selector circuit 42, switching is performed between the peak detecting mode which compares the peak values of the feedback current Isense and the control value Ictrl from the compensating circuit 30 by the comparison circuit 35, thereby controlling the peak values of the feedback current Isense, and the valley detecting mode which compares the control value Izero and the valley values of the feedback current Isense, thereby controlling them.

According to the present embodiment, each time a peak value or a valley value of the feedback current Isense is detected, the mode that detects the feedback current Isense is switched between the peak detecting mode and the valley detecting mode. In the peak detecting mode, the peak values of the feedback current Isense can be controlled. By this control, the average currents of the feedback current Isense can be controlled to be equal when the control mode is switched between PFM control and PWM control as described above. Further, in the valley detecting mode, the second switching transistor 12 can be controlled to turn off at the timings when the feedback current Isense becomes zero, and hence a phenomenon in which the inductance current $I_L$ flows backward to the ground side can be avoided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply circuit comprising:
    a switching element of which a main current path is connected between an input end to which to apply a direct-current input voltage and an output end outputting an output voltage, the switching element being controlled to be on/off by a drive signal applied to the control electrode thereof;
    a control value generating circuit that compares the output voltage and a predetermined reference voltage to generate a control value based on the comparing result;
    a comparison circuit that compares a feedback current corresponding to an output current and the control value to output an output signal corresponding to the comparing result;
    a switching signal generating circuit that generates a switching signal having a constant period in a PWM control mode and generates a switching signal at timings when the output voltage becomes less than a threshold voltage in a PFM control mode;
    a drive signal generating circuit that generates the drive signal in response to the switching signal from the switching signal generating circuit and the output signal of the comparison circuit; and
    a control circuit that, in switching a control mode between the PWM control mode and the PFM control mode, changes the control value of the control value generating circuit to a new control value so that an average of the feedback current after the control mode switching becomes equal to an average of the feedback current before the control mode switching.

2. The power supply circuit according to claim 1, wherein the control circuit switches the mode of the switching signal generating circuit to the PWM control mode when the frequency of the switching signal becomes greater than a threshold frequency and switches the mode of the switching signal generating circuit to the PFM control mode when the control value becomes less than a predetermined threshold.

3. The power supply circuit according to claim 2, wherein the drive signal generating circuit generates, as the drive signal, a pulse signal whose risings are controlled by the switching signal from the switching signal generating circuit and whose fallings are controlled by the output signal of the comparison circuit.

4. The power supply circuit according to claim 3, comprising a second comparison circuit that outputs a second output signal according to the result of comparing the output voltage and the threshold voltage, wherein the switching signal generating circuit generates the switching signal in response to the second output signal of the second comparison circuit and a clock signal having a constant period.

5. The power supply circuit according to claim 4, further comprising a counter that counts the frequency of the output signal of the switching signal generating circuit to supply the result to the control circuit.

6. The power supply circuit according to claim 2, wherein the control circuit outputs a switch signal whose signal level changes according to the control mode, and the switching signal generating circuit makes the switching signal rise in response to a change in the signal level of the switch signal when the control mode is switched.

7. The power supply circuit according to claim 1, wherein the control circuit calculates the control value after the control mode switching using the control value before the control mode switching, the period of switching of the switching element before the control mode switching, and the period of switching of the switching element after the control mode switching.

8. A power supply circuit comprising:
    a first switching transistor of which one end of a main current path is connected to an input end and the other end is connected to an output end, the first switching transistor being controlled to be on/off by a first drive signal supplied to the control electrode thereof; and
    a second switching transistor of which one end of a main current path is connected to the output end and the other end is connected to a reference potential, the second switching transistor being controlled to be on/off by a second drive signal supplied to the control electrode thereof,
    wherein the first switching transistor is controlled to be on/off by the first drive signal applied to the first switching transistor to adjust an output voltage,
    wherein the power supply circuit has:
    a first mode that controls fallings of the first drive signal to follow timings when a feedback current corresponding to an output current becomes greater than a preset first control value;
    a second mode that controls fallings of the second drive signal to follow timings when the feedback current becomes less than a preset second control value; and
    a mode switching control circuit that switches to the second mode when the feedback current becomes greater than the preset first control value in the first mode and switches to the first mode when the feedback current becomes less than the preset second control value in the second mode.

9. The power supply circuit according to claim 8, comprising:
    a comparison circuit that has a first input end to which the first control value or the second control value is supplied according to whether the mode has been switched to the first mode or the second mode, and a second input end to which the feedback current is supplied; and a drive signal generating circuit that generates the drive signal in response to the output of the comparison circuit.

10. The power supply circuit according to claim 9, comprising a control value generating circuit that compares the output voltage and a predetermined reference voltage to generate the first control value based on the comparing result.

11. The power supply circuit according to claim 10, further comprising a holding circuit that holds the value of the feedback current when in a standby state as the second control value.

12. The power supply circuit according to claim 11, further comprising a selector circuit that selects either the output signal of the holding circuit or the output signal of the control value generating circuit according to whether the mode has been switched to the first mode or the second mode so as to supply to the comparison circuit.

13. The power supply circuit according to claim 8, comprising:
a control value generating circuit that compares the output voltage and a predetermined reference voltage to generate a control value based on the comparing result;
a switching signal generating circuit that generates a switching signal having a constant period in a PWM control mode and generates a switching signal at timings when the output voltage becomes less than a threshold voltage in a PFM control mode;
a drive signal generating circuit that generates the first drive signal in response to the switching signal from the switching signal generating circuit and the output signal of the comparison circuit; and
a control circuit that performs control to switch the control mode of the switching signal generating circuit between the PFM control mode and the PWM control mode according to the frequency of the switching signal and the control value from the control value generating circuit.

14. The power supply circuit according to claim 13, wherein the control circuit switches the control mode of the switching signal generating circuit to the PWM control mode when the frequency of the switching signal becomes greater than a threshold frequency and switches the control mode of the switching signal generating circuit to the PFM control mode when the control value from the control value generating circuit becomes less than a predetermined threshold.

15. A control method of a power supply circuit which comprises:
a switching element of which a main current path is connected between an input end to which to apply a direct-current input voltage and an output end outputting an output voltage, the switching element being controlled to be on/off by a drive signal applied to the control electrode thereof;
a control value generating circuit that compares the output voltage and a predetermined reference voltage to generate a control value based on the comparing result;
a comparison circuit that compares a feedback current corresponding to an output current and the control value;
a pulse width control circuit that adjusts pulse widths of the drive signal according to the comparing result of the comparison circuit; and a drive control circuit that switches a control mode to PWM control mode or PFM control mode and supplies the drive signal to the control electrode of the switching element, wherein
the control method comprising:
obtaining the control value before switching the control mode between the PWM control mode and the PFM control mode;
obtaining a period of switching of the switching element before switching the control mode between the PWM control mode and the PFM control mode;
obtaining a period of switching of the switching element after switching the control mode between the PWM control mode and the PFM control mode;
obtaining a new value by calculating using the control value before the control mode switching, the period of switching of the switching element before the control mode switching, and the period of switching of the switching element after the control mode switching; and
setting the new value as a new control value after the control mode switching.

16. The control method of the power supply circuit according to claim 15, wherein
the power supply circuit comprises a compensating circuit that outputs the control value obtained from an error value between the output voltage and the predetermined reference voltage, and
the setting the new value comprises changing the control value of the compensating circuit to the new control value when the control mode is switched.

17. The control method of the power supply circuit according to claim 16, further comprising:
switching from the PWM control mode to the PFM control mode when the control value becomes less than a predetermined threshold; and
switching from the PFM control mode to the PWM control mode when the frequency of switching of the switching element becomes higher than a predetermined frequency.

18. The control method of the power supply circuit according to claim 15, further comprising:
switching from the PWM control mode to the PFM control mode when the control value becomes less than a predetermined threshold; and
switching from the PFM control mode to the PWM control mode when the frequency of switching of the switching element becomes higher than a threshold frequency.

19. The control method of the power supply circuit according to claim 15, wherein the obtaining a new value comprises:
obtaining a ratio of the period of switching of the switching element in the PFM control mode before the control mode switching to the period of switching of the switching element in the PWM control mode after the control mode switching in switching from the PFM control mode to the PWM control mode; and
obtaining the new value by dividing the control value before the control mode switching by the square root of the ratio.

20. The control method of the power supply circuit according to claim 15, wherein the obtaining a period of switching of the switching element before switching the control mode comprises
obtaining an average of periods of multiple cycles before the control mode switching as the period of switching of the switching element in the PFM control mode in switching from the PFM control mode to the PWM control mode.

\* \* \* \* \*